United States Patent Office 3,441,704
Patented Apr. 29, 1969

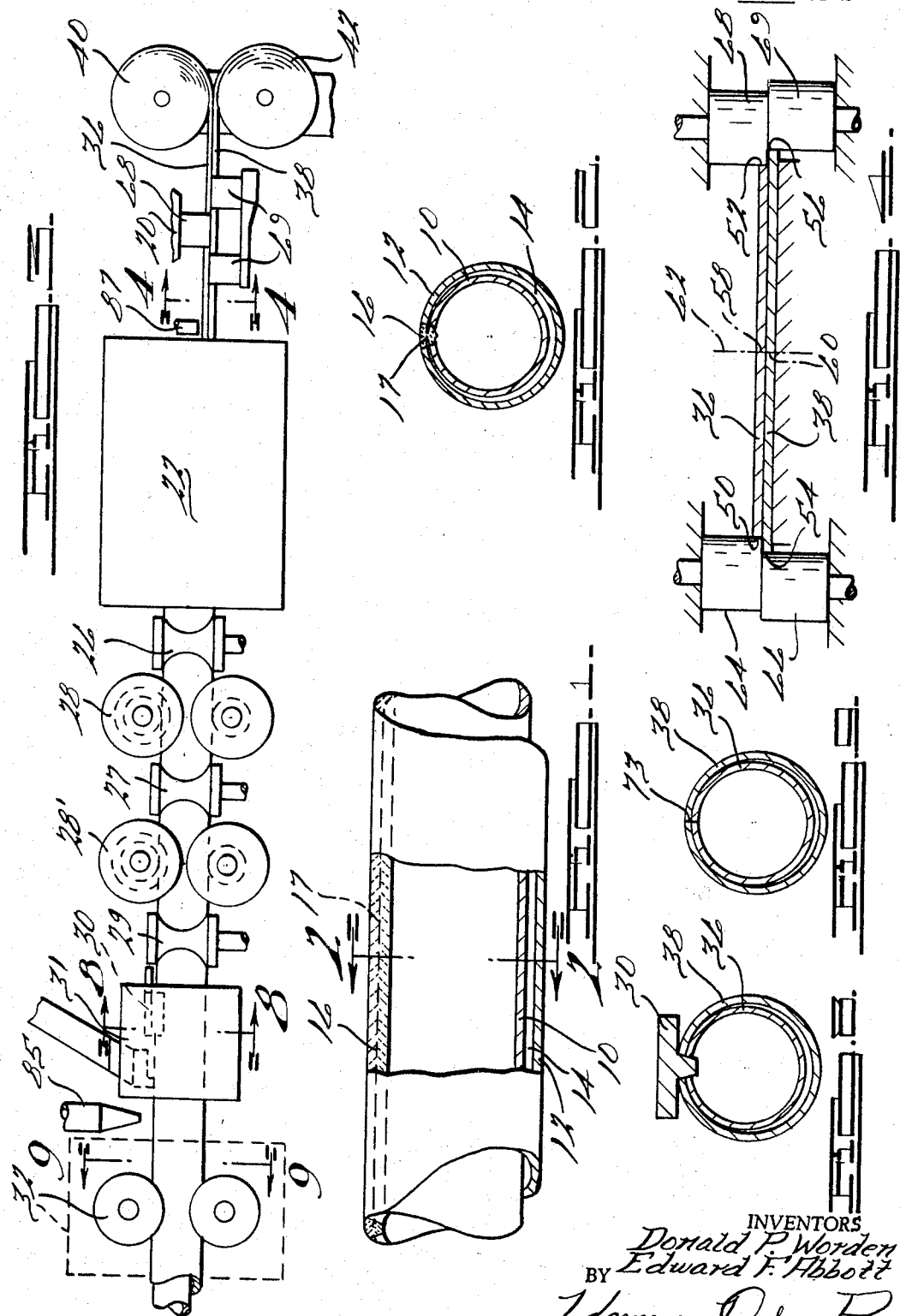

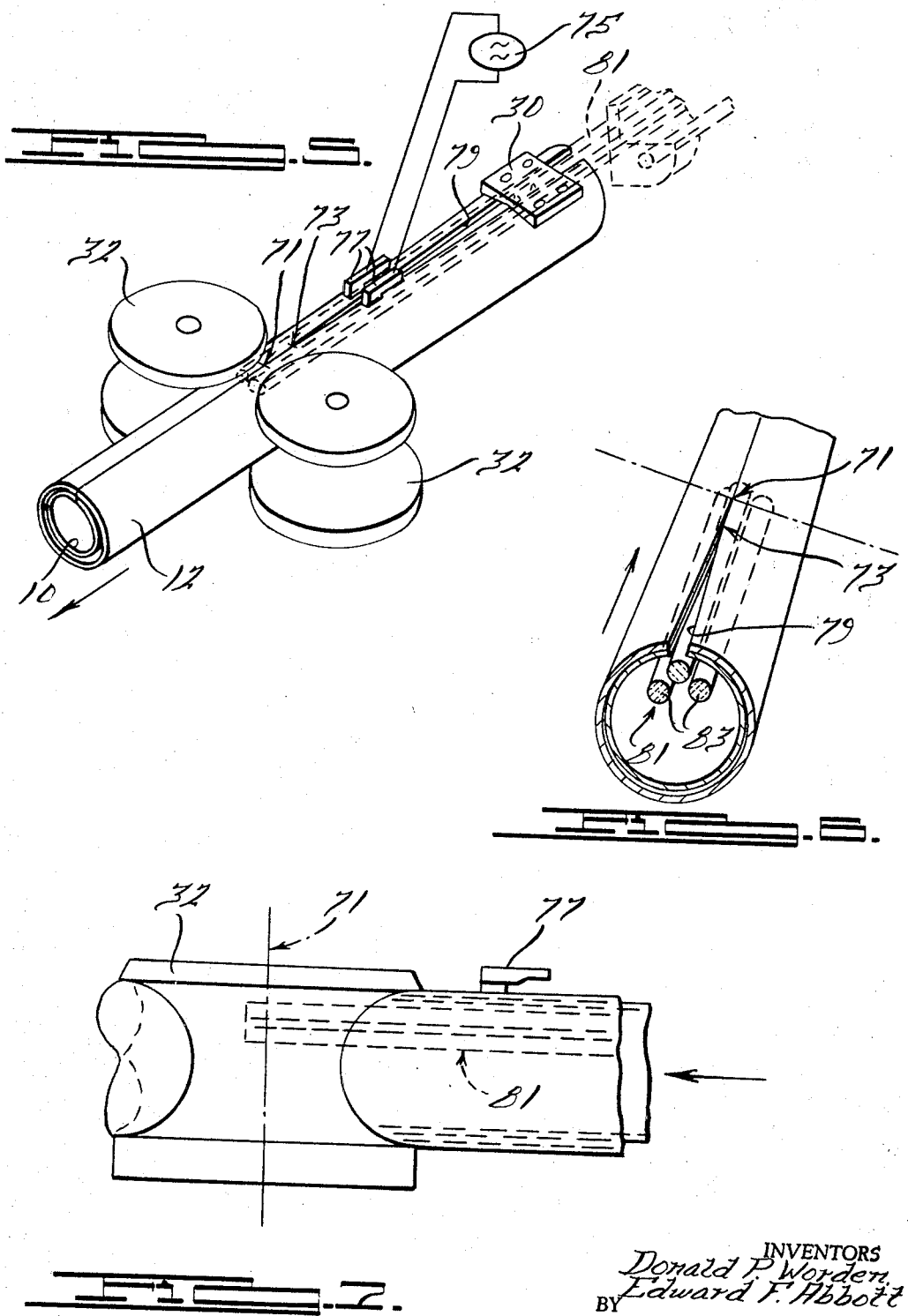

3,441,704
METHOD OF MAKING AN EXHAUST SYSTEM CONDUIT
Donald P. Worden, Racine, Wis., and Edward F. Abbott, Harrisonburg, Va., assignors to Walker Manufacturing Company, Racine, Wis., a corporation of Delaware
Filed June 15, 1966, Ser. No. 557,733
Int. Cl. B23k *31/06*
U.S. Cl. 219—67
8 Claims

ABSTRACT OF THE DISCLOSURE

A laminated conduit is formed by rolling overlapped sheets into telescoped tubes and simultaneously welding the edges of each sheet together to form longitudinal seams in each tube which are stronger than any cross welded between the tubes so that the tubes are separable and movable relative to each other.

---

This invention relates to internal combustion engine exhaust systems and in particular, to laminated exhaust conduits (i.e., exhaust and tailpipes) and their method of manufacture; and is related to our copending application Ser. No. 304,391, filed Aug. 26, 1963, now Patent No. 3,354,286.

Properly constructed laminated or plural wall exhaust conduits have sound absorbing properties that are desirable in internal combustion engine exhaust systems. In the past, however, it has been relatively difficult and expensive to manufacture such conduit and this has tended to curtail its usage. Accordingly, it is the object of this invention to provide a new and improved method of manufacturing laminated exhaust conduit and a new laminated exhaust conduit structure itself.

In accordance with the invention all layers of the exhaust conduit are simultaneously formed from flat steel strips into tubes that have the mating edges simultaneously welded together in a common weld extending longitudinally of the conduit. The weld is such that the abutting edges of each layer are permanently welded together but the layers are not permanently welded to each other so that the resulting structure comprises one welded tube inside another and movable relative to it.

Other features and advantages of the invention will become apparent upon consideration of the accompanying drawings in which:

FIGURE 1 is a partial longitudinal section of a length of laminated pipe constructed in accordance with the invention; showing the gap between layers in exaggerated form;

FIGURE 2 is a cross sectional view taken along the line 2—2 in FIG. 1;

FIGURE 3 is a schematic illustration of apparatus in which the laminated pipe shown in FIG. 1 may be made;

FIGURE 4 is an enlarged cross sectional view taken along the line 4—4 in FIG. 3 of sheet material stock from which the laminated pipe is made as it enters the tube mill of FIG. 3;

FIGURE 5 is a perspective schematic view of the welding apparatus at the stage where welding occurs;

FIGURE 6 is a schematic perspective view showing the ferrite rods inside the tubes adjacent the weld point;

FIGURE 7 is schematic side view as taken of the structure in FIG. 5;

FIGURE 8 is a cross sectional view of the sheet material taken along the line 8—8 in FIG. 3 and showing the formed sheets material just prior to the welding operation with the edges of the outside tube very slightly farther apart than the edges of the inside tube; and FIGURE 9 is a cross sectional view along the line 3—3 of FIG. 3 showing both the inner and outer tube edges meeting at the preclosing point together.

Referring now to FIGS. 1 and 2, the subject laminated exhaust conduit is shown to comprise a plurality of circular wall portions 10, 12 which are separated from one another by a gap 14 around substantially all of the periphery. The weld area is indicated by one 16 at which opposite edges of each tube are welded together. The figures show the conduit immediately after formation and the zone 17 between the two layers indicates a plane of weakness that will result in fracture of the bond or weld that may occur between so that the two pipes become separate and relatively movable one inside the other.

The conduit of the present invention is preferably formed continuously in a tube mill such as shown schematically in FIG. 3 for purposes of illustration. A suitable mill conventionally comprises a sheet guide portion 20, a set of forming rolls 22, a set of idle rolls 26, 27, a set of fin rolls 28, 28′, a set of gap control rolls 29, a seam guide 30, a weld heater 31, and squeeze rolls 32. Conventionally, sheet material is fed into the forming rolls 22 and formed into a tubular form with the edges of the sheet gradually formed around into closely spaced abutting relationship. The fin and gap control rolls and the seam guide maintain the spaced abutting edges in a particular relationship prior to passage through the heater 31. In the heater, the edges of the sheet are heated to the melting point and the edges are abuttingly engaged and welded to one another in the squeeze rolls 32.

In the present invention, flat continuous strips 36, 38 of sheet material for each wall of the laminated pipe to be formed are fed into the forming rolls from coils 40, 42 through special guide means 20 which are adapted to maintain the sheets of material in parallel aligned relationship. The sheets of material are of different widths with the sheet of material forming the inner tubular portions being narrower than the sheet of material forming the outer tubular portions. The sheets of material may be stacked on one another with the widest sheet at the bottom and the narrowest sheet at the top as they are fed ino the forming roll portion of the mill. The side edges of the inner sheet of material are equally offset inwardly from the parallel side edges of the wider sheet of material. In other words, the longitudinal centerline of the sheets of material are aligned and each side edge of the upper sheet, or sheets, is inwardly offset relative to the adjacent parallel edge of the lower sheet, or sheets. The amount of the offset should be approximately equal to one-half the difference in width of the sheets for maximum results.

Referring now to FIG. 4, the relationship of the sheets of material to one another is shown in detail. Edges 50, 52 of the upper sheet 36 are spaced inwardly relative to the corresponding edges 54, 56 of the lower sheet 38. The longitudinal centerlines 58, 60 of the sheets are approximately aligned as shown by the dashed line 62 in FIG. 4. The sheets may be aligned in the predetermined manner by suitable side guide rolls 64, 66 and 68, 69 which may be mounted on adjustable slides so that the position of the sheets relative to one another can be adjusted until they are substantially aligned. Although substantial alignment is critical, the sheets of material do not have to be exactly aligned since, surprisingly and unexpectedly, the forming rolls tend to center and maintain the sheets of material centered during the forming operation. The manner of forming of the sheets of material, which lie in abutting relationship as they pass through the tube mill, actually induces forces which tend to keep the sheets exactly centered relative to one another. Consequently, any tendency of the sheets to slide transversely relative to one another and to shift their initially aligned position is completely eliminated in the forming rolls and the separating slots formed as the edges of the sheets are turned upwardly and inwardly toward one another tend to remain aligned.

As the sheets 36 and and 38 pass through the rolls 22 and roll up toward tubular form the edges 52 and 50 of the inside tube and the edges 54 and 56 of the outside tube converge toward each other, the ultimate welded union, or final closing or weld point 71 (FIG. 5) occurring in the sequeeze rolls 32 at substantially the plane of maximum radial pressure on the tubes. There is a preclosing point 73 upstream of the weld point 71 where first sparking occurs as the radio frequency current (e.g., 420–470,000 cycles) supplied by power source 75 to the contacts 77 begins to bridge the gap 79 between the edges of the tubes. It will be seen that the contacts engage the outer tube only on opposite sides of the gap 79 and a substantial distance upstream of the preclosing point 73. In order to concentrate the effect of the high frequency current along the edges of the tubes an impeder or magnetic core means 81, preferably in the form of three ferrite rods 83 positioned as shown, is located inside the tubes. This reduces current flow around the tube walls and seems to produce a magnetic field along the edges of the tube gap which enables the current to more readily flow along them, thus concentrating the heating effect and making a relatively narrow weld zone. This appears also to decrease the tendency for the weld of the edges of the outer tube to be permanently united with the weld of the edges of the inner tube, i.e., it seems to help weaken the weld 16 along the plane 17 in FIGURES 1 and 2. It also assists in getting sufficient heat at the edges 50 and 52 for a good weld on the inside tube. The ferrite rods 83 preferably terminate a short distance downstream of the weld point 71 as can be seen in FIG. 7. The rods 83 are mounted in position and supported by a suitable bracket (not shown) with the point of attachment extending through the space between the tube edges, at a suitable position upstream as is known in the art.

Weakening of the weld 16 so as to permit separation of the two layers along the plane 17 in FIGURES 1 and 2 is also believed to be assisted by the provision of an air jet 85 that furnishes a stream of high pressure air on the weld area at and ahead of the weld as shown schematically in FIG. 3. This improves the overall heating effect of the inside and outside tubes and minimizes embrittlement of the weld areas. Also the coolant furnished during rolling of the strips into the tube by the coolant outlet schematically shown at 87 in FIG. 3 is permitted to flow between the tubes beyond the weld point and is also believed to help maintain the gap 14 and a uniformly weak weld joint between the two layers.

The V gap opening 79 is quite critical and must be held very uniformly for optimum results. It is important that the edges 54 and 56 of the outside tube be very slightly farther apart (i.e., about .030 to .040 inch) than the edges 50 and 52 of the inside tube at the point of application of weld current by contacts 77. This is accomplished by the shape of the rolls 28 and 28' and the seam guide 30 as seen in FIG. 8 as well as by the relative dimensions of the strips 36 and 38. It is also important that both the inner tube edges and the outer tube edges meet each other at the preclosing point 73 together as indicated in FIG. 9, i.e., neither pair of edges should meet before the other.

This is accomplished through the forces applied to the tubes by the rolls and guides as well as by the relative dimensions of the strips 36 and 38. No general formula applicable to each tube mill is known at this time. However, it is desirable to provide for a gap 14 of about .004 inch on each side between the two layers, a reduction in circumference of the inside tube in the order of .010 in welding, and an expected growth of the inside tube in the order of 1.176% of the width of strip 36. The goal of the strip dimensioning is to obtain the edge relationships described above and shown in FIGS. 8 and 9 in order to get a weak bond or joint 17 between the layers. Adjustments of the power supplied to contacts 77 can also be made to promote weakness along line 17, less power promoting such weakness. Adjustment of the intensity of the air jet 85 also provides a means to control weakness along line 17.

In order to obtain satisfactory results, the side edges 50, 52, 54, and 56 of the sheets should be positioned and maintained in the manner indicated. The location of the side surfaces of the sheets as they leave the forming rolls and especially at the point where they are contacted by contacts 77 and thereafter is crucial. The opposite side surfaces of each sheet must be aligned and in substantially parallel vertical planes as they enter the welder 31 and the guide 30 may be stepped if necessary to accomplish this. The adjacent side surfaces of different sheets need not be, and preferably are not in alignment. In other words, at this critical stage of manufacture, the outermost sheet 38 will normally have a slightly wider gap than the next adjacent inner sheets 36. In fact, we have found that the most satisfactory results are obtained when the edges of the sheets have a stepped relationship as shown in FIG. 8. In this position, the offset dimension between the edges 50, 54 and between the edges 52, 56 is preferably in a range of .015 to .020 inch. The offset tends to minimize the difference between the heating of the outside and inside tubes. The exact relationship is crucial particularly in the fin rolls where substantially greater misalignment of the edges will result in radial inward deflection of the edges 50, 52 of the inner sheet 36 or sheets. In order to maintain the edges 50, 52 in the desired relationship in the fin rolls, the idle rolls 26 are adjusted to exert extra pressure until the gap between the edges 50, 52 of the sheet 36 is made approximately .040 to .050 inch smaller than the gap between edges 54 and 56. Additionally, the gap control rolls 29 are also adjusted to provide pressure against the seam guide 30 to maintain the desired gap relationship.

As indicated the final weld point 71 is substantially in the plane of the center lines of squeeze rolls 32. The preclosing point 73 is upstream from point 71 by about $\frac{3}{16}$ to $\frac{3}{8}$ inch. More important than its exact location is that it remains constant in position and to this end the seam guide width and location and the weld squeeze pressure are properly adjusted. The apex of the V-gap is located between the points 71 and 73 and varies from about $\frac{1}{8}$ to $\frac{3}{16}$ inch downstream form the preclosing point 73.

It is a basic concept of the invention to get a minimum of liquid metal at the weld zone so as to avoid a strong cross weld while still obtaining strong intra-tube welds. This is accomplished by control of the edge relationships as described above and by controlling the weld heat and squeeze pressure (rolls 32) to the minimum side, i.e., as low heat and pressure as possible consistent with good welds.

After the tubing is formed in the above manner to obtain the plane of weakness 17 through the weld, a relatively slight or nominal stress on the weld will cause fracture along the plane 17 and separation of the two tubes. This stress may be applied in various ways, as by bending the tubes or rotating one relative to the other.

In order to properly weld laminated tubing, it is not, surprisingly enough, necessary to increase the power requirements in the welding heater unit in proportion to the increase in total wall thickness of sheet material being welded. In other words, whereas in previous sheet welding operations sheet material of, for example, .045 thickness might be satisfactorily welded by a given power input, in the present type of sheet welding operation two sheets of, for example, .045 thickness have been found to be capable of being joined at a common seam by a power input far less than expected. It would seem that two sheets of material would require at least twice the power input of one sheet of material. However, by our methods of manufacture an increase in power input in the range of approximately only 20 to 25% is required. In fact, with the aforementioned conditions controlled extremely closely and under ideal welding conditions, the power input requirement may be as low as only an extra 10%. Thus it may be readily seen that laminated pipe can be manufactured relatively inexpensively.

It should be noted that the method is not limited to tubing formed from sheets 36 and 38 of the same thickness or of the same material. They may be of different thicknesses in which case minor adjustments may be required in one or more of the several variables indicated to obtain the desired result. In general if the inner sheet 36 is the thinner it may be made slightly wider then if it is the same thickness as the sheet 38; and, conversely, if it is thicker it should be slightly narrower.

The inventive principles hereinbefore described for illustrative purposes may be otherwise various applied by reference to the presently preferred embodiments within the intended scope of the appended claims.

We claim:

1. The method of forming laminated exhaust conduit or the like from at least two substantially flat sheets of metal, said conduit comprising telescoped tubes each having a longitudinal welded seam formed by welding the longitudinal edges of the sheet together and the conduit being characterized by the weld forming the seam of each tube being substantially stronger than any cross weld between the seams on the concentric tubes, said method comprising positioning the sheets together with one overlying the other, applying tube forming forces and tube forming guide pressure to said sheets so as to gradually change the shape of the sheets from flat to tubular while moving said sheets in a longitudinal direction, the opposite edges of each sheet forming a V-shaped gap as it approaches final tubular shape wherein said opposite edges are juxtaposed and the tubes are telescoped together, maintaining the edges of the outer tube forming its V-shaped gap slightly farther apart than the edges of the inner tube forming its V-shaped gap, maintaining the V-gap on each tube so that the edges of each tube meet in the apex of the V at substantially the same point in the longitudinal movement of the tubes, and causing welding current to flow along the edges of each tube toward the apex of its gap to heat said edges to welding temperature while maintaining the faces of opposite heated edges of each sheet substantially parallel to each other, and applying welding pressure downstream of the apex to the tubes to force the opposite heated edges together to effect welding of the edges and form a longitudinal welded seam in each tube which is stronger than any cross weld between the tubes.

2. The method of claim 1 including passing coolant between the inner and outer tubes during application of welding current and pressure.

3. The method of claim 1 including directing a jet of pressurized air at the weld area at and just upstream of the point of application of welding pressure.

4. The method of claim 1 including localizing the welding current at the edges of the V-gaps by means of a magnetic impeder located inside the inner tube.

5. The method of claim 1 including applying stress after welding to the formed tubes to fracture any cross weld between the tubes and to separate the inner tube from the outer tube.

6. The method of claim 1 including passing coolant between the inner and outer tubes during application of welding current and pressure, directing a jet of pressurized air at the weld area at and just upstream of the point of application of welding pressure, and localizing the welding current at the edges of the V-gaps by means of an impeder located inside the inner tube.

7. The method of claim 6 including applying stress after welding to the formed tubes to fracture any cross weld between the tubes and to separate the inner tube from the outer tube.

8. The method of making laminated exhaust conduit or the like which comprises simultaneously forming said conduit from separate sheets of metal by rolling them into telescoped tubes and welding the separate sheets at a common joint which consists of welded seams in each tube and a cross weld between the tubes, said cross weld being substantially weaker than said welded seams and said joint having a plane of weakness in said cross weld between the tubes such that the tubes are separable upon the application of stress to the joint.

References Cited

UNITED STATES PATENTS

| | | | |
|---|---|---|---|
| 3,072,770 | 1/1963 | Goodridge | 219—67 X |
| 3,118,045 | 1/1964 | Kohler | 219—59 |
| 3,209,115 | 9/1965 | Van Iperen | 219—59 |
| 3,354,286 | 11/1967 | Worden et al. | 219—67 X |

RICHARD M. WOOD, *Primary Examiner.*

B. A. STEIN, *Assistant Examiner.*

U.S. Cl. X.R.

29—413